US009223269B2

(12) United States Patent
Suzuki

(10) Patent No.: US 9,223,269 B2
(45) Date of Patent: Dec. 29, 2015

(54) DRIVE TRANSMISSION DEVICE, FIXING DEVICE, AND IMAGE FORMING APPARATUS

(71) Applicant: CANON KABUSHIKI KAISHA, Tokyo (JP)

(72) Inventor: Takafumi Suzuki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/524,896

(22) Filed: Oct. 27, 2014

(65) Prior Publication Data

US 2015/0117918 A1  Apr. 30, 2015

(30) Foreign Application Priority Data

Oct. 30, 2013  (JP) ................................. 2013-225585

(51) Int. Cl.
*G03G 15/00* (2006.01)
*G03G 21/18* (2006.01)
*G03G 15/20* (2006.01)
*G03G 21/16* (2006.01)
*F16H 31/00* (2006.01)
*F16H 57/04* (2010.01)
*F16D 41/22* (2006.01)

(52) U.S. Cl.
CPC ............ *G03G 15/2053* (2013.01); *F16D 41/22* (2013.01); *F16H 31/001* (2013.01); *F16H 57/0464* (2013.01); *G03G 15/757* (2013.01); *G03G 21/1647* (2013.01); *G03G 21/1857* (2013.01); *F16D 2300/06* (2013.01); *G03G 2221/1657* (2013.01)

(58) Field of Classification Search
CPC ............ G03G 15/757; G03G 21/1857; G03G 2221/1657; F16D 41/185; F16H 31/001; F16H 57/0464
See application file for complete search history.

(56) References Cited

U.S. PATENT DOCUMENTS

| 2006/0257166 A1* | 11/2006 | Ahn et al. ...................... 399/167 |
| 2009/0185830 A1* | 7/2009 | Kim ............................... 399/222 |
| 2011/0158711 A1* | 6/2011 | Fukushima .................... 399/297 |
| 2014/0140745 A1* | 5/2014 | Choi et al. ..................... 399/381 |

FOREIGN PATENT DOCUMENTS

JP          07-61619 A        3/1995

* cited by examiner

*Primary Examiner* — Rodney Bonnette
(74) *Attorney, Agent, or Firm* — Canon USA Inc. IP Division

(57) ABSTRACT

In a drive transmission device, a transmission member moves in a rotational axis direction of an input member, and is able to move to a position for engaging with an output member and a position for not engaging with the output member. When the input member is rotating in a first direction, the transmission member engages with the output member so that the output member rotates, and when the input member rotates in a second direction opposite to the first direction, the transmission member does not engage with the output member. A gap filled with a viscous material is disposed between the output member and the transmission member, and a hole communicating with the gap is formed in the output member.

25 Claims, 20 Drawing Sheets

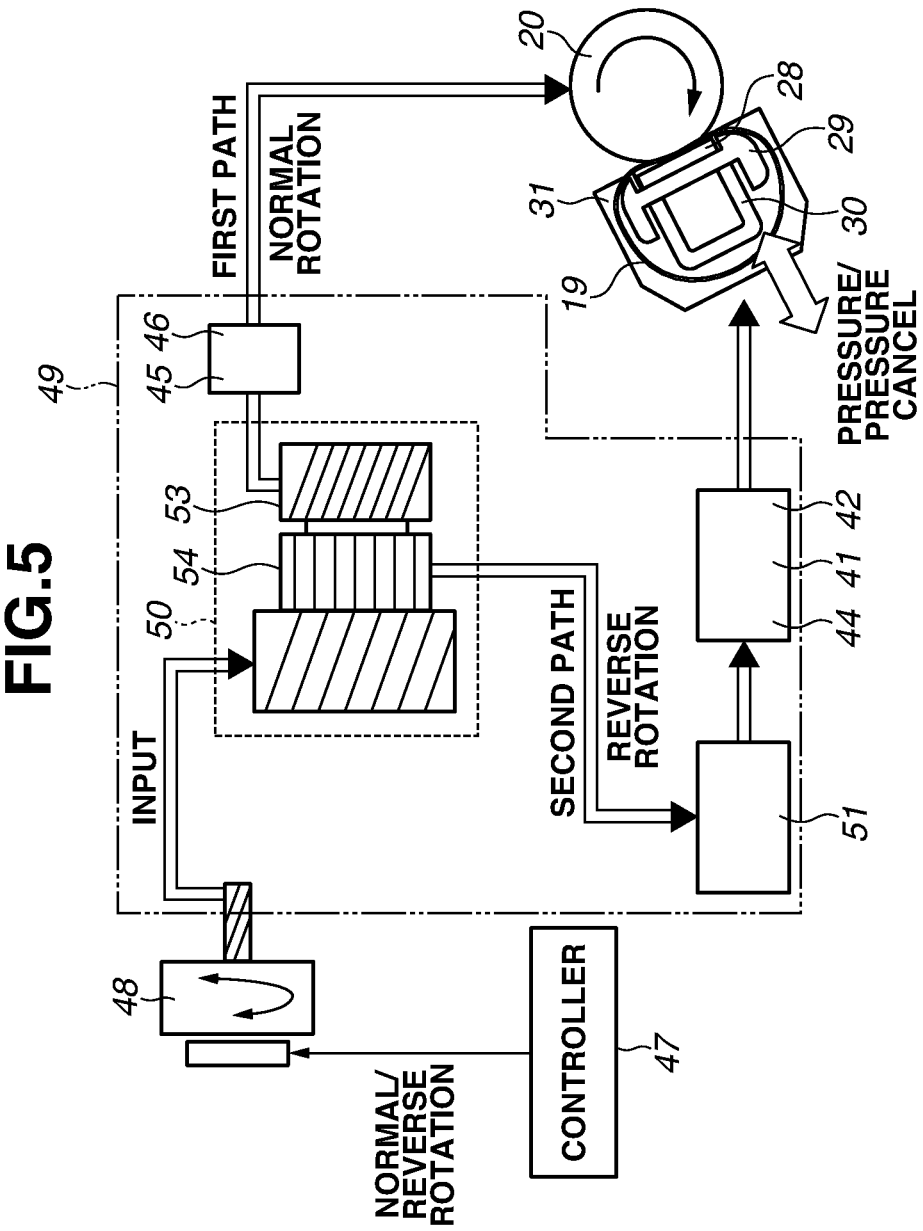

DRIVE TRANSMISSION DEVICE, FIXING DEVICE, AND IMAGE FORMING APPARATUS

BACKGROUND

1. Field of the Invention

The present disclosure relates to a drive transmission device, a fixing device, and an image forming apparatus including a one way clutch mechanism that transmits or cuts off a driving force, input from a drive source, to a driven member, in accordance with a rotation direction.

2. Description of the Related Art

Some drive transmission devices, for a fixing device of an image forming apparatus, include a one way clutch mechanism. The one way clutch mechanism uses a drive source (motor), rotatable in normal and reverse directions, to transmit the driving force to a driven member when the motor is rotating in only one of the normal or reverse direction. One such one way clutch mechanism includes a transmission member (ratchet) that is disposed between coaxially rotatable input and output members. The transmission member can rotate together with the input member, and move in a rotational axis direction. In the mechanism, engaged and disengaged states of the transmission member and the output member are switched in accordance with the normal/reverse rotation of the input member.

A configuration for reducing the noise during a state where the transmission member is not engaged with the output member (when the transmission member is idling) is discussed in Japanese Patent Application Laid-Open No. 7-61619. Specifically, a cam surface is provided at a position of contact between the input member and the transmission member. Thus, when the input member rotates, the transmission member is moved toward the output member in a rotational shaft direction by the effect of the cam surface. Thus, the transmission member engages with the output member, whereby the driving force is transmitted from the input member to the output member through the transmission member.

In the configuration discussed in Japanese Patent Application Laid-Open No. 7-61619, a rotational load needs to be applied to the transmission member to make the transmission member move in the rotational axis direction by the effect of the cam surface. This is because the transmission member is forcibly rotated upon receiving force from the input member through the cam surface.

As one possible method of applying the rotational load, a gap between the output member and the transmission member is filled with a viscous material having a viscous force. With this method, a force for holding the transmission member in the rotation direction (force for preventing the rotation of the transmission member) can be produced between the output member and the transmission member. Thus, the transmission member can be moved in the rotational axis direction by the effect of the cam surface to engage with the output member.

However, when the gap between the output member and the transmission member is simply filled with the viscous material, the viscous material has no place to go when the output member comes into contact with the transmission member, and thus might flow into a gap between the input member and the transmission member. When this happens, the input member attaches to the transmission member by the viscous force of the viscous material. Thus, the transmission member integrally rotates with the input member, before being moved in the rotational axis direction by the effect of the cam surface. Thus, the transmission member cannot be moved in the rotational axis direction by the effect of the cam surface, and thus the driving force might fail to be transmitted to the output member.

SUMMARY

The present disclosure is directed to a configuration for preventing an operation failure of a transmission member caused by a viscous material.

According to an aspect disclosed herein, a drive transmission device includes an input member rotated by a drive source, a transmission member capable of integrally rotating with the input member, and an output member capable of rotating while engaging with the transmission member. The transmission member moves in a rotational axis direction of the input member, and is able to move to a position to be engaged with the output member and a position for not engaging with the output member, and when the input member is rotating in a first direction, the transmission member engages with the output member so that the output member rotates, and when the input member rotates in a second direction opposite to the first direction, the transmission member does not engage with the output member. A gap filled with a viscous material is disposed between the output member and the transmission member, and a hole communicating with the gap is formed in the output member.

According to another aspect disclosed herein, a fixing device includes an input member rotated by a drive source, a transmission member capable of integrally rotating with the input member, an output member capable of rotating while engaging with the transmission member, a first rotary member rotated by the output member, and a second rotary member configured to come into contact with the first rotary member to form a nip portion. The first rotary member and the second rotary member come into contact with each other to form the nip portion in which a recording medium is nipped and heated so that toner is fixed on the recording medium. The transmission member moves in a rotational axis direction of the input member, and is able to move to a position for engaging with the output member and a position for not engaging with the output member, and when the input member is rotating in a first direction, the transmission member engages with the output member so that the output member rotates, and when the input member rotates in a second direction opposite to the first direction, the transmission member does not engage with the output member. A gap filled with a viscous material is disposed between the output member and the transmission member, and a hole communicating with the gap is formed in the output member.

According to yet another aspect disclosed herein, an image forming apparatus includes an input member rotated by a drive source, a transmission member capable of integrally rotating with the input member, an output member capable of rotating while engaging with the transmission member, and a rotary member rotated by the output member. An image is formed on a recording medium by rotating the rotary member. The transmission member moves in a rotational axis direction of the input member, and is able to move to a position for engaging with the output member and a position for not engaging with the output member, and when the input member is rotating in a first direction, the transmission member engages with the output member so that the output member rotates, and when the input member rotates in a second direction opposite to the first direction, the transmission member does not engage with the output member. A gap filled with a viscous material is disposed between the output member and the transmission member, and a hole communicating with the gap is formed in the output member.

Further features of the present invention will become apparent from the following description of exemplary embodiments with reference to the attached drawings.

BRIEF DESCRIPTION OF THE DRAWINGS

FIG. 5 is a schematic view of drive transmission paths to the fixing device.

DESCRIPTION OF THE EMBODIMENTS

Figure 1:
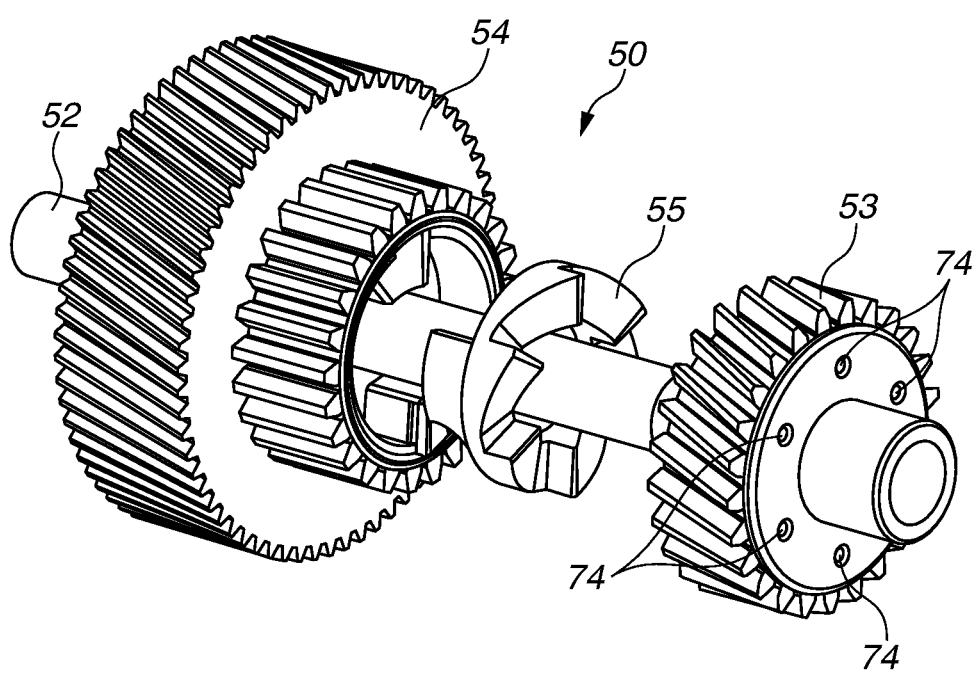
FIG. 1 is a perspective view of a one way clutch gear unit disassembled in a support shaft direction.

Various exemplary embodiments, features, and aspects of the invention will be described in detail below with reference to the drawings.

A first exemplary embodiment is described below. An exemplary embodiment is applied to an electrophotographic color laser beam printer will be described by referring to the drawings. The color laser beam printer is an example of an image forming apparatus according to the present invention. There is no intention to limit the scope of the present invention to the sizes, materials, shapes, relative positions and the like of components described in exemplary embodiments, unless otherwise noted. The image forming apparatus according to the present invention is not limited to the color laser printer, and the present invention may be applied to other image forming apparatuses such as a copying machine or a fax machine.

First, an entire configuration of the image forming apparatus will be described, and then the configuration related to a one way clutch gear unit, which is a characteristic configuration of the present invention, will be described in detail.

<Entire Configuration of Image Forming Apparatus>

Figure 2:
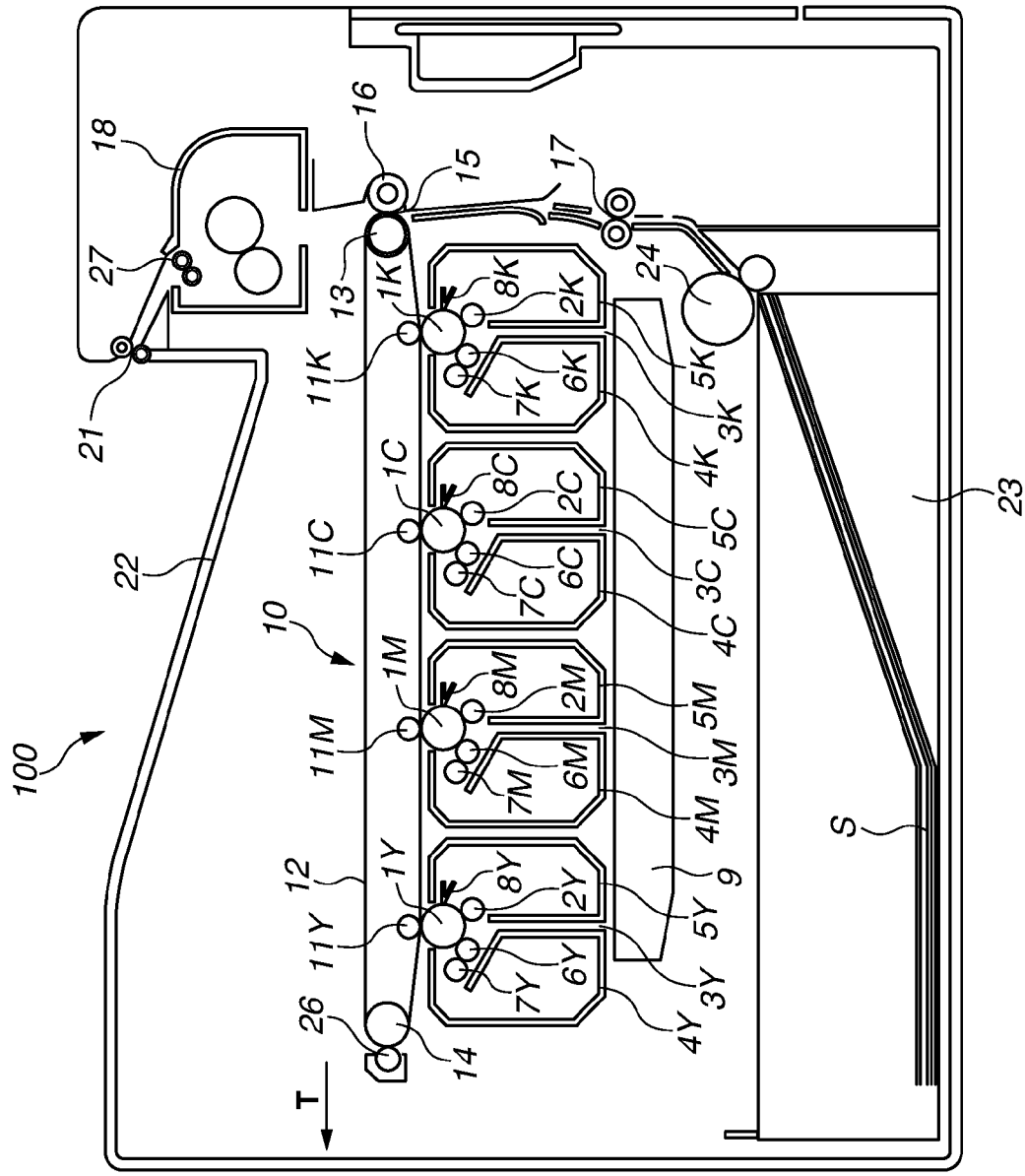
FIG. 2 is a schematic cross-sectional view of an image forming apparatus.

An overview of the entire configuration of the image forming apparatus will be described by referring to FIG. 2. FIG. 2 is a schematic front cross-sectional view of the image forming apparatus. The image forming apparatus forms an image on a sheet S as a recording medium, and mainly includes an image forming process unit, a cleaning unit, a sheet feeding unit, a secondary transfer unit, and a fixing discharge unit.

Each of the components are described below by referring to FIG. 2.

(Image Forming Process Unit)

An image forming apparatus main body 100 illustrated in FIG. 2 includes process cartridges 3Y, 3M, 3C, and 3K detachably attached to the image forming apparatus main body 100. The four process cartridges 3Y, 3M, 3C, and 3K have the same configuration, but differ in the color of images they form. Specifically, images are respectively formed with yellow toner, magenta toner, cyan toner, and black toner. The process cartridges 3Y, 3M, 3C, and 3K respectively include developing units 4Y, 4M, 4C, and 4K and cleaner units 5Y, 5M, 5C, and 5K.

The former components, that is, the developing units 4Y, 4M, 4C, and 4K, respectively include developing rollers 6Y, 6M, 6C, and 6K, toner-applying rollers 7Y, 7M, 7C, and 7K, and toner containers. The latter components, that is, the cleaner units 5Y, 5M, 5C, and 5K, respectively include photosensitive drums 1Y, 1M, 1C, and 1K as image carriers, charging rollers 2Y, 2M, 2C, and 2K, drum cleaning blades 8Y, 8M, 8C, and 8K, and waste toner containers.

A scanner unit 9 is disposed vertically below the process cartridges 3Y, 3M, 3C, and 3K, and exposes the photosensitive drums 1Y, 1M, 1C, and 1K based on an image signal. The photosensitive drums 1Y, 1M, 1C, and 1K are charged to a predetermined negative polarity potential by the charging rollers 2Y, 2M, 2C, and 2K. Then, an electrostatic latent image is formed on each of the photosensitive drums 1Y, 1M, 1C, and 1K by the scanner unit 9. The electrostatic latent images are subjected to reversal developing by the developing units 4Y, 4M, 4C, and 4K, and toner having negative polarity adheres to the electrostatic latent images. Thus, yellow, magenta, cyan, and black toner images are formed.

In an intermediate transfer belt unit 10, an intermediate transfer belt 12 is stretched between a driving roller 13 and a tension roller 14. The tension roller 14 applies a tensile force to the intermediate transfer belt 12 in a direction of an arrow T. The photosensitive drums 1Y, 1M, 1C, and 1K each rotate in the clockwise direction in FIG. 2, and the intermediate transfer belt 12 rotates in the counterclockwise direction.

Primary transfer rollers 11Y, 11M, 11C, and 11K are disposed on the inner side of the intermediate transfer belt 12 and respectively opposite to the photosensitive drums 1Y, 1M, 1C, and 1K. An unillustrated bias applying unit applies transfer bias to the primary transfer rollers 11Y, 11M, 11C, and 11K.

By applying the positive bias to the primary transfer rollers 11Y, 11M, 11C, and 11K, the toner images are sequentially primarily transferred onto the intermediate transfer belt 12, starting from the one on the photosensitive drum 1Y. Thus, the toner images of the four colors in an overlapping state are conveyed to a secondary transfer unit 15.

(Cleaning Unit)

The toner remaining on the surfaces of the photosensitive drums 1Y, 1M, 1C, and 1K after the toner images have been transferred is removed by the drum cleaning blades 8Y, 8M, 8C, and 8K. The toner, remaining on the intermediate transfer belt 12 after secondary transferring to the sheet S, is removed by an intermediate transfer belt cleaning device 26 to be collected in the unillustrated waste toner collection container.

(Sheet Feeding Unit)

The sheet feeding unit includes a sheet feeding roller 24 attached to the image forming apparatus main body 100 and a sheet feeding cassette 23 as a sheet cassette detachably attached to the image forming apparatus main body 100.

The sheet feeding roller 24 is rotated by the driving force from an unillustrated sheet feeding drive unit. The sheet feeding drive unit is fixed to the image forming apparatus main body 100 and is held by a sheet feeding driving frame and a rear frame not illustrated. A driving mechanism such as a gear is disposed between the two frames.

The sheets S are separated from the sheet feeding cassette 23 one at a time by the driving force of the sheet feeding drive unit, to be conveyed to a pair of registration rollers 17. The pair of registration rollers 17 carries out the final skew correction of the sheet S and image writing in an image forming unit, and adjusts the sheet convey timing.

(Secondary Transfer Unit)

The sheet S fed from the sheet feeding unit is conveyed to the secondary transfer unit 15 by the pair of registration rollers 17. In the secondary transfer unit 15, the positive bias is applied to a secondary transfer roller 16, whereby the toner image of the four colors on the intermediate transfer belt 12 is secondarily transferred onto the sheet S thus conveyed.

(Fixing Discharge Unit)

The sheet S having the toner image transferred thereon is conveyed to a fixing device 18. The toner image on the surface of the sheet S is fixed on the sheet S by heat and pressure. After the fixing, the sheet S is conveyed to the sheet discharge side by fixing discharge rollers 27. The sheet S conveyed from the fixing discharge rollers 27 is conveyed to discharge rollers 21, to be discharged onto a discharge tray 22.

<Fixing Device>

Figure 3:
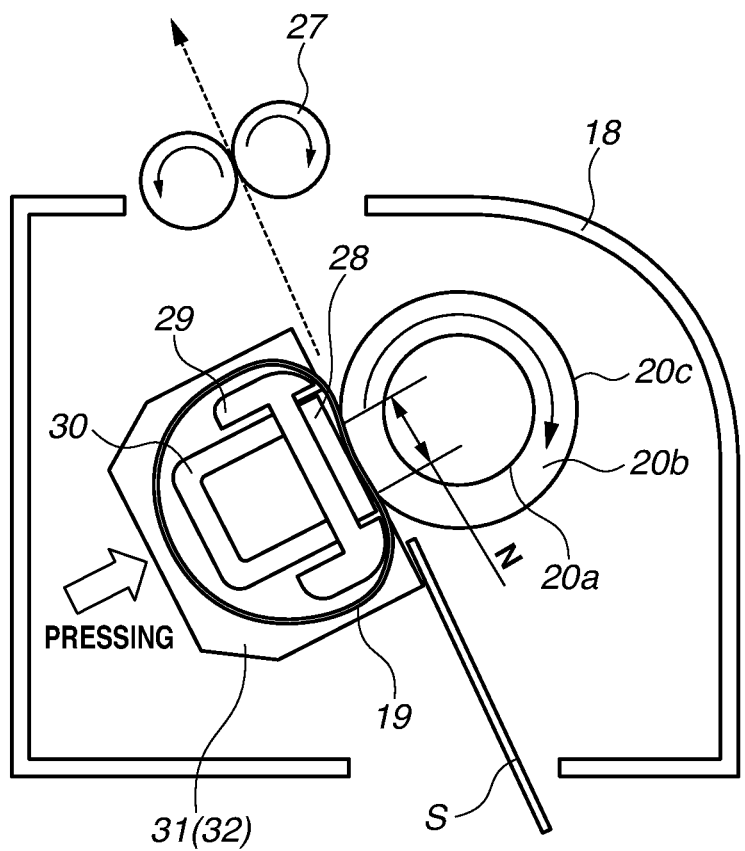
FIG. 3 is a schematic cross-sectional view of a fixing device.

Next, the configuration of the fixing device 18 will be described. FIG. 3 is a schematic cross-sectional view of the fixing device 18.

The fixing device 18 can be removed from the image forming apparatus main body 100 to be replaced. To fix the toner image, the fixing device 18 includes first and second rotary members that come into pressure contact with each other to form a fixing nip portion N.

A fixing film (hereinafter, simply referred to as "film") 19 is the first rotary member, and is a flexible film in the form of a cylinder. A ceramic heater (hereinafter, simply referred to as "heater") 28 is a heating source that comes into contact with an inner circumferential surface of the film 19. A heat resistant and rigid film guide 29, which has an approximately semicircular gutter shaped cross section, guides the rotation of the film 19 and holds the heater 28. The film 19 loosely fits around the film guide 29, to which the heater 28 is attached. A rigid pressure stay 30, having a rectangular U shaped cross section, is disposed on the inner side of the film guide 29.

The movement path of the film 19 is regulated by outer or inner circumferential surfaces of flanges 31 and 32 fixed to the film guide 29 to face both end portions of the film 19 in the longitudinal direction. In this exemplary embodiment, the inner circumferential surfaces of the flanges 31 and 32 regulate the movement of the film 19 in the longitudinal direction and the movement path of the both end portions of the film 19.

The film 19 is a composite laminated structure formed by providing an elastic layer, a releasing layer, or the like on an outer circumferential surface of a heat resistant resin belt or a metal melt as a base layer. The film 19 is thin over its entirety and has flexibility, high heat conductivity, and low heat capacity. The heater 28 is an oblong and thin linear heating member having low heat capacity. The longitudinal direction of the heater 28 is orthogonal to the movement direction of the film 19 and the sheet S.

A pressing roller 20 as the second rotary member is formed by providing an elastic layer 20b such as silicone rubber having a predetermined hardness, on a cored bar 20a. A fluororesin such as PTFE, PFA, or FEP may be further provided on the outer circumference, to achieve lower viscosity.

The film 19, incorporating the film guide 29, the heater 28, and the pressure stay 30, and the pressing roller 20 receive pressure from a pressure applying mechanism described later, and thus form the fixing nip portion N as a heating nip portion. An unfixed image on the sheet S is fixed when the sheet S passes through the fixing nip portion N.

Figure 4A:
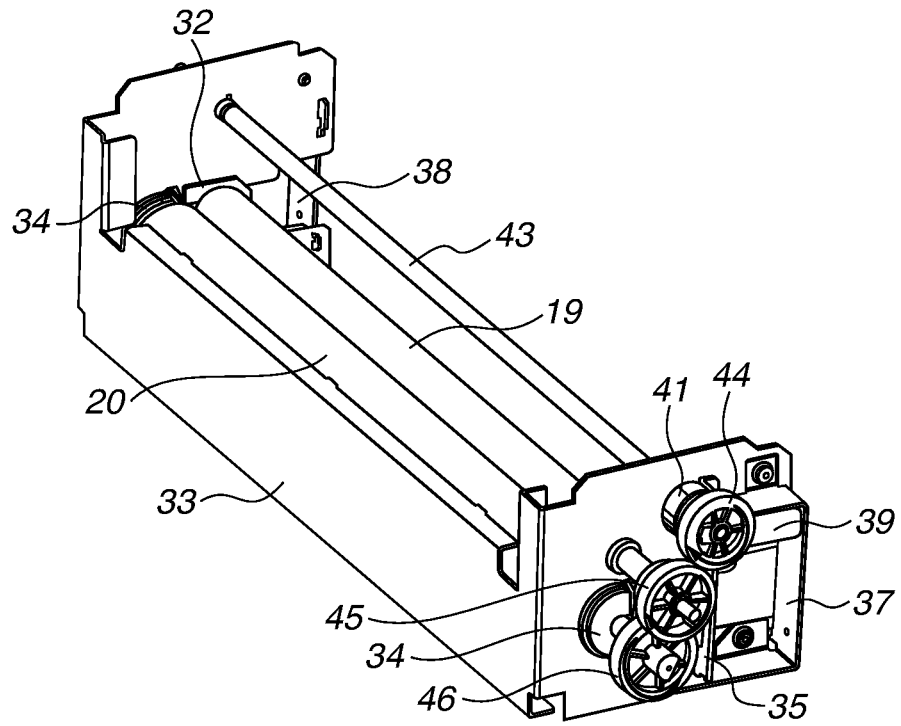
FIGS. 4A and 4B are perspective views of the fixing device.
Figure 4B:
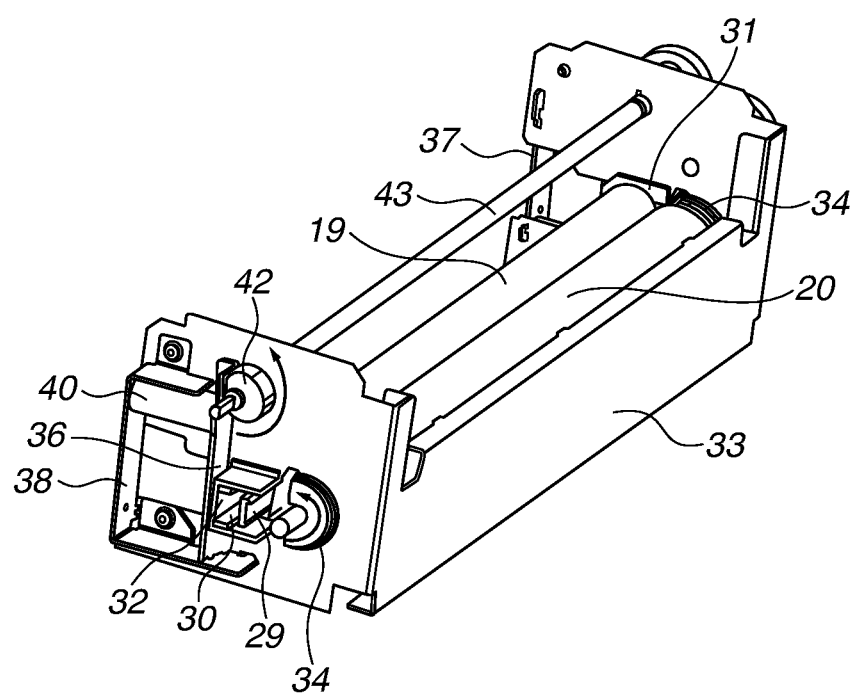

Next, a pressure release mechanism and a drive train of the fixing device 18 will be described. FIGS. 4A and 4B are perspective views of the fixing device 18.

Both end portions of the pressing roller 20 are respectively supported, in a rotatable manner, by bearing portions 34 attached to a frame 33 held in the fixing device 18. The film 19 is supported by the frame 33 in such a manner as to be movable in directions to come into contact with and separate from the pressing roller 20. The flanges 31 and 32 are pressed by pressurization plates 35 and 36. One end portion of each of the pressurization plates 35 and 36 is supported, in a rotatable manner, by one of support frames 37 and 38 attached to the frame 33.

Pressurization springs 39 and 40 are respectively disposed between the support frame 37 and the pressurization plate 35 and between the support frame 38 and the pressurization plate 36, and press the pressurization plates 35 and 36 toward the flanges 31 and 32. In such a configuration, the pressurization springs 39 and 40 respectively press the flanges 31 and 32 so that the film 19 comes into pressure contact with the pressing roller 20 through the film guide 29 and the heater 28. Thus, the fixing nip portion N is formed.

The pressure contact state of the film 19 and the pressing roller 20 can be preferably released (pressure release of the fixing nip portion N) when a paper jam or the like occurs while the sheet S is passing through the fixing nip portion N. Thus, the fixing device 18 has a configuration in which the pressure contact state of the film 19 and the pressing roller 20 is releasable.

Cams 41 and 42 are fixed to both sides of a rotational shaft 43 of the rotary member rotatably supported by the frame 33. The cams 41 and 42 come into contact with and thus regulate the positions of the pressurization plates 35 and 36. A gear 44 that transmits the driving force to the rotational shaft 43 is fixed to one side of the rotational shaft 43.

When the pressure contact state of the film 19 and the pressing roller 20 needs to be released, the driving force is transmitted to the gear 44 to rotate the rotational shaft 43, and thus the cams 41 and 42 are rotated. Thus, the radius of portions of the cams 41 and 42 contacting the pressurization plates 35 and 36 changes, whereby the pressurization plates 35 and 36 are pressed to move against the force applied by the pressurization springs 39 and 40, and thus are separated from the flanges 31 and 32. Thus, the pressure contact state of the film 19 and the pressing roller 20 is released, whereby the sheet S can be easily removed from the fixing nip portion N.

Gears 45 and 46 for driving the pressing roller 20 is rotatably supported by the frame 33. The driving force from a motor 48 (see FIG. 5) as a drive source disposed in the image forming apparatus main body 100 is transmitted to the gears 45 and 46.

<Drive Transmission Path>

Next, drive transmission paths to the fixing device 18 will be described. FIG. 5 is a schematic view of the drive transmission paths to the fixing device 18. A controller 47 controls the motor 48 so that the motor 48 rotates in the normal direction during image forming, and rotates in the reverse direction when the paper jam occurs. A drive train 49, to which the driving force is transmitted from the motor 48, includes a clutch unit 50, the gears 45 and 46, a swinging gear 51, the gear 44, and the cams 41 and 42 that transmit the driving force in a single direction only.

The clutch unit 50 includes an input gear 54 and an output gear 53. A drive transmission path, through which the driving force is transmitted from the output gear 53, is referred to as a first path. A drive transmission path, through which the driving force is transmitted from the input gear 54, is referred to as a second path. The clutch unit 50 and the swinging gear 51 are supported by the fixing device 18. Thus, when the fixing device 18 is removed from forming apparatus main body 100 to be replaced for example, the clutch unit 50 and the swinging gear 51 are also detached from the image forming apparatus main body 100.

When the sheet S is conveyed, the controller 47 performs the normal rotation control on the motor 48. When the motor 48 is rotating in the normal direction, the clutch unit 50 transmits the driving force to the first and the second paths. Thus, the clutch unit 50 transmits the driving force from the output gear 53 to the pressing roller 20 through the first path, that is, through the gears 45 and 46. The clutch unit 50 also transmits the driving force from the output gear 54 to the swinging gear 51 through the second path.

The position of the rotation center of the swinging gear 51 changes when the rotation direction of the motor 48 is switched. Specifically, the rotation center moves to the position at which no driving force is transmitted to the gear 44, when the motor 48 rotates in the normal direction, and moves to the position at which the driving force is transmitted to the gear 44, when the motor 48 rotates in the reverse direction. Thus, when the motor 48 is rotating in the normal direction, the driving force is transmitted through the second path so that the swinging gear 51 rotates, but the gear 44 and the cams 41 and 42 do not rotate, and thus the pressure release of the fixing nip portion N does not occur.

When an unillustrated sensor that detects the paper jam in the fixing device 18 detects the paper jam, the controller 47 performs reverse rotation control on the motor 48. When the motor 48 rotates in the reverse direction, the clutch unit 50 transmits the driving force only to the second path. Specifically, in the clutch unit 50, the output gear 53 does not rotate and thus the driving force is not transmitted to the pressing roller 20 through the first path, and the driving force is transmitted only to the swinging gear 51 through the second path.

When the motor 48 rotates in the reverse direction, the rotation center of the swinging gear moves to the position, at which the driving force is transmitted to the gear 44 as described above. As a result, the driving force is transmitted to the cam 41 and 42 through the gear 44. Thus, the pressure release of the fixing nip portion N is achieved. To resume the image forming from the pressure released state, the motor 48 is further rotated in the reverse direction to further rotate the cam 41 and 42. Thus, the pressing of the pressurization plates and 36 by the cams 41 and 42 is released, and the flanges 31 and 32 are pressed by the force applied from the pressurization springs 39 and 40. As a result, the film 19 can come into pressure contact with the pressing roller 20.

<One Way Clutch Gear Unit>

Figure 6:
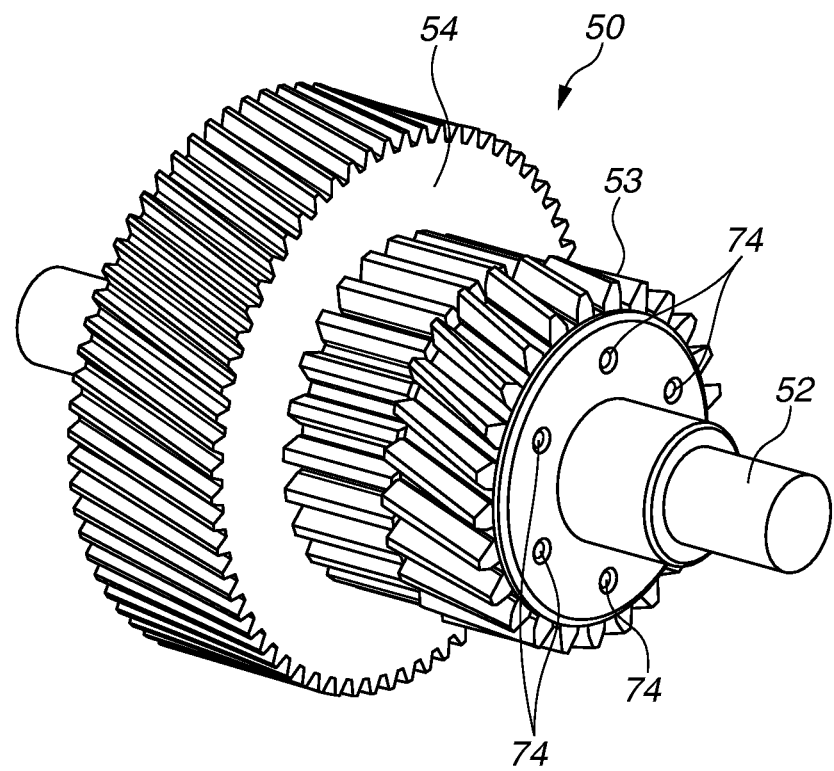
FIG. 6 is a perspective view of the entire one way clutch gear unit.

Next, the configuration of the clutch unit 50 will be described. As described above, the clutch unit 50 is incorporated in the drive train 49 and switches between the transmission and cut off of the driving force in accordance with the rotation direction of the motor 48. FIG. 6 is a perspective view of the entire clutch unit 50. The clutch unit 50 loosely fits a supporting shaft (fixed shaft) 52. FIG. 1 is a perspective view of the one way clutch gear unit disassembled in a direction of the supporting shaft 52.

The clutch unit 50 includes the input gear 54 as an input member that rotates upon receiving the driving force from the motor 48, the output gear 53 as an output member, and the transmission member 55 that transmits the driving force from the input gear 54 to the output gear 53. The input gear 54 and the output gear 53 are coaxially supported by the supporting shaft 52 in a rotatable manner. The transmission member 55 can rotate between the input and output gears 54 and 53, and can also move in a rotational axis direction (extending direction of the supporting shaft 52) of the input gear 54.

Figure 7A:
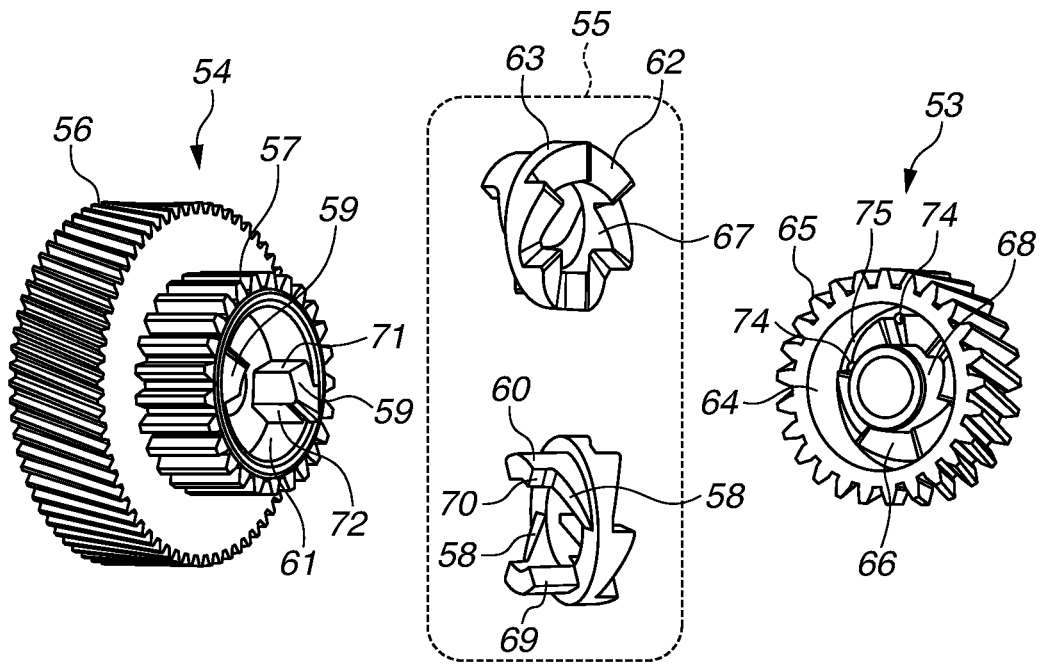
FIGS. 7A and 7B are respectively a perspective view and a cross-sectional view of an input gear, an output gear, and a transmission member.
Figure 7B:
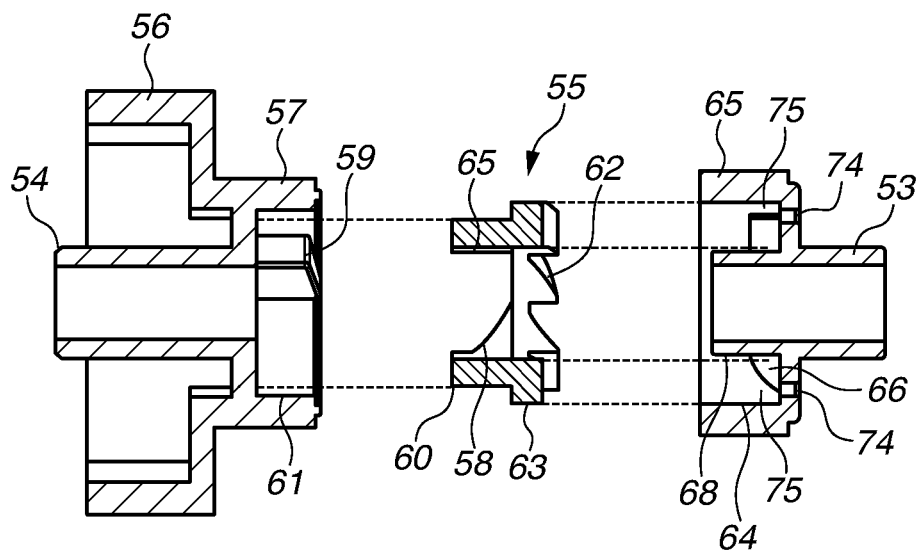

Next, the components of the clutch unit 50 will be described. FIG. 7A is a perspective view of the input gear 54, the output gear 53, and the transmission member 55. FIG. 7B is a cross-sectional view of the input gear 54, the output gear 53, and the transmission member 55.

The input gear 54 includes the following two gear portions: a gear portion 56 meshing with an unillustrated gear that rotates upon receiving the driving force from the motor 48; and a gear portion 57 meshing with the swinging gear 51. The input gear 54 includes protrusions 59 that come into contact with slope surfaces 58 of the transmission member 55. The protrusions 59 are disposed at two positions symmetric about the rotation center. Each protrusion 59 is provided with surfaces 71 and 72. The surfaces 71 and 72 are respectively on front end and rear end sides of each protrusion 59 with respect to the rotation direction, when the motor 48 is rotating in the reverse direction.

The transmission member 55 includes, on a side of the input gear 54, the slope surfaces (cam surfaces) 58 that come into contact with the protrusions 59, surfaces 69 that can come into contact with the surfaces 71 when the motor 48 rotates in the reverse direction, and surfaces 70 that can come into contact with the surfaces 72 when the motor 48 rotates in the normal direction. The surfaces 70 are provided continuously to the slope surfaces 58. Each of the slope surfaces 58, the surfaces 69, and the surfaces are disposed at two positions symmetrical about the rotation center.

The transmission member 55 includes, on a side of the output gear 53, a ratchet 62 as a drive transmission claw that meshes (engages) with a ratchet 66 of the output gear 53 and transmits the driving force to the output gear 53.

The output gear 53 includes the ratchet (engaging unit) 66 that meshes (engages) with the ratchet 62 of the transmission member 55, a gear portion 65 that meshes with the gear 45, and holes 74 described later.

A ratchet outer circumferential surface 63 of the transmission member 55 loosely fits an output gear inner circumferential surface 64 of the output gear 53. Thus, when the transmission member 55 moves in the rotational axis direction of the input gear 54, the movement of the transmission member 55 and the coaxial rotation of the input gear 54 are guided. A gap between the ratchet outer circumferential surface 63 of the transmission member 55 and the output gear inner circumferential surface 64 of the output gear 53 is filled with grease as a viscous material.

A slope surface cam outer circumferential surface 60 of the transmission member 55 and an input gear inner circumferential surface 61 of the input gear 54 have a 0.8 mm gap in between, and thus do not come into contact with each other. Similarly, an inner circumferential surface 67 of the transmission member 55 and an inner side outer circumferential surface 68 of the output gear 53 have a 0.3 mm gap in between, and thus do not come into contact with each other at the time of operation.

<Drive Transmission Switching Operation>

Figure 8:
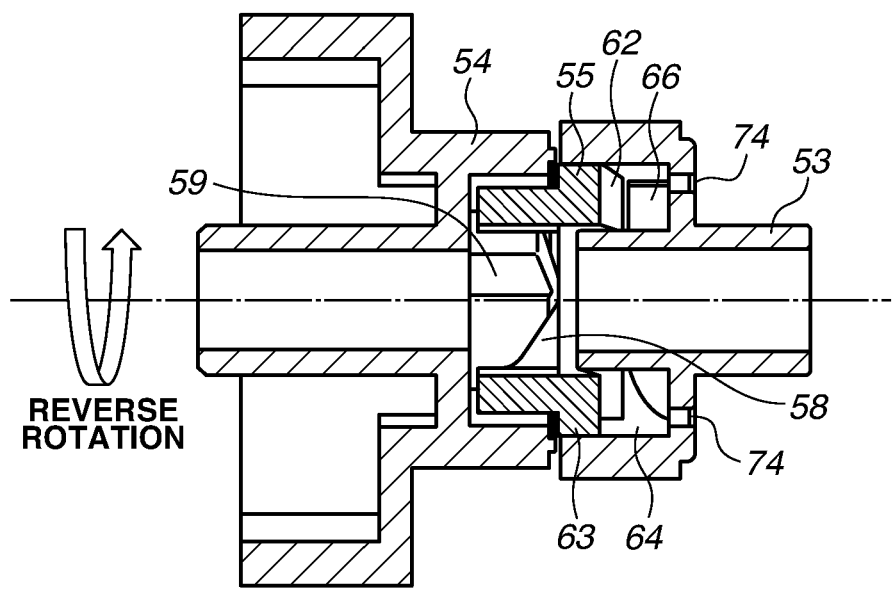
FIG. 8 is a cross-sectional view of the one way clutch gear unit, in a state where the driving force is cut off with the motor rotating in a reverse direction.
Figure 9:
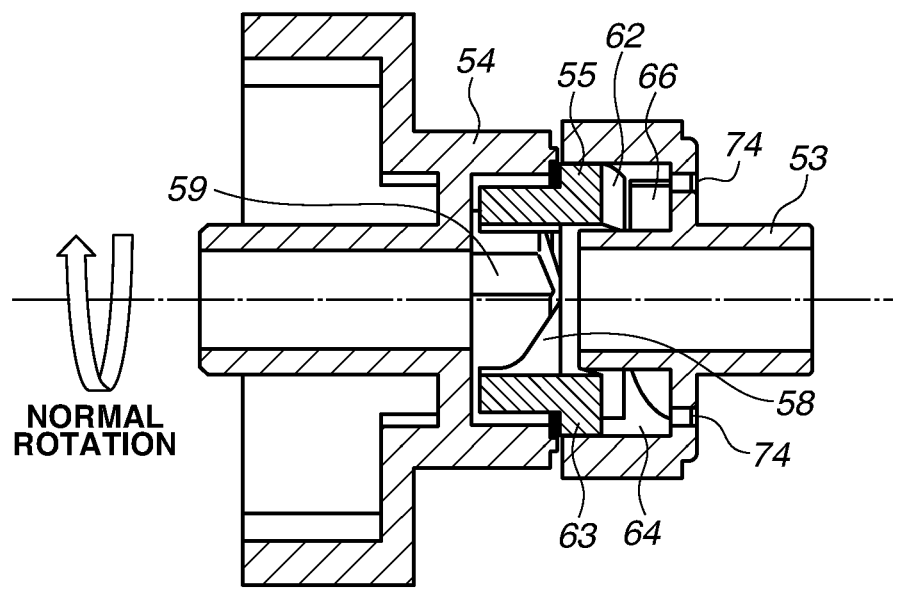
FIG. 9 is a cross-sectional view of the one way clutch gear unit, in a state where the driving force is cut off with the motor rotating in a normal direction.
Figure 10:
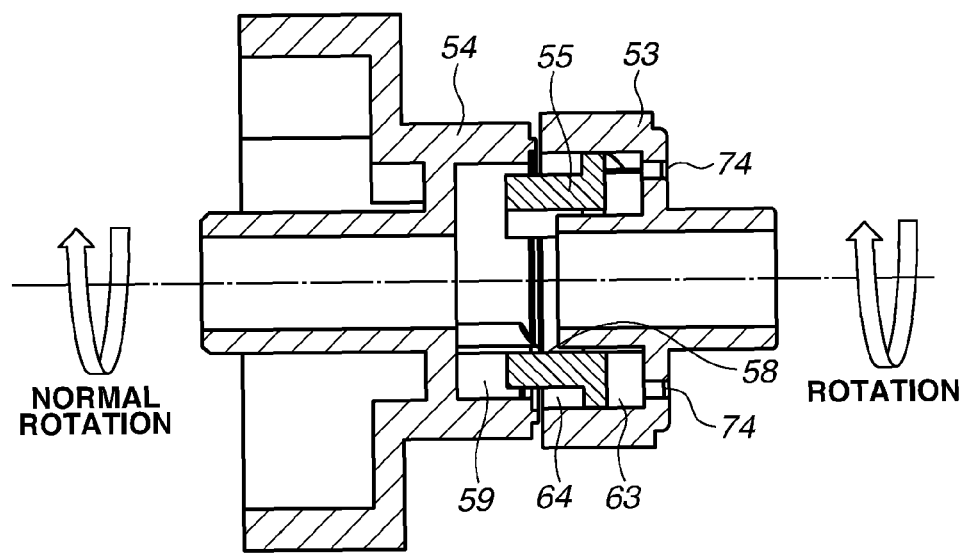
FIG. 10 is a cross-sectional view of the one way clutch gear unit, in a state where the driving force is transmitted with the motor rotating in the normal direction.

An operation of switching between connection and disconnection of the drive train with the configuration of the clutch unit 50 described above, will be described. FIG. 8 is a cross-sectional view of the one way clutch unit in a state where the drive train is disconnected with the motor 48 rotating in the reverse direction. FIG. 9 is a cross-sectional view of the one way clutch unit in a state where the drive train is disconnected with the motor 48 rotating in the normal direction. FIG. 10 is a cross-sectional view of the one way clutch unit in a state where the driving force is transmitted with the motor 48 rotating in the normal direction.

First, a state where the drive train is disconnected at the output gear 53 will be described. The driving force is transmitted to the input gear 54 from the motor 48. Here, the motor 48 rotates in the reverse direction, and thus in FIG. 8, the input gear 54 rotates in a direction opposite to a direction of the protrusion 59 coming into contact with the slope surface 58. Thus, the surface 71 of the protrusion 59 comes into contact with the surface 69, whereby the transmission member 55 integrally rotates with the input gear 54 and does not move towards the output gear 53 in the rotational axis direction of the input gear 54. Thus, the ratchet 62 of the transmission member 55 does not mesh (engage) with the ratchet 66 of the output gear 53, whereby the drive train is disconnected and the driving force is not transmitted from the input gear 54 to the output gear 53.

The surfaces 71 and 69 are formed as surfaces parallel to the rotational axis direction of the input gear 54, so that the transmission member 55 does not move towards the output gear 53 in the rotational axis direction of the input gear 54 when the motor 48 is rotating in the reverse direction. Alternatively, at least one of the surfaces 71 and 69 may be inclined so that a force for pulling the transmission member 55 towards the input gear 54 in the rotational axis direction of the input gear 54 is produced.

Next, an operation of switching from the state where the drive train is disconnected at the output gear 53 to the state where the drive train is connected will be described. When the motor 48 starts rotating in the normal direction, in FIG. 9, the input gear 54 rotates in a direction of the front end portion (contact portion) of the protrusion 59 coming into contact with the slope surface 58. The grease is provided between the inner circumferential surface 64 of the output gear 53 and the ratchet outer circumferential surface 63 of the transmission member 55. Thus, a holding force that makes the output gear 53 and the transmission member 55 integrally rotate, while holding each other, can be produced by a shearing force of the grease.

The output gear inner peripheral surface 64 loosely fits the ratchet outer peripheral surface 63 of the transmission member 55, and thus the friction force between the surfaces serves as a part of the holding force described above. When the motor 48 starts rotating in the normal direction, the output gear 53 is not moving. Thus, the holding force (force to integrally rotate with each other) serves as a rotational load for the transmission member 55. Thus, the input gear 54 rotates faster than the transmission member 55, and the front end portion (contact portion) of the protrusion 59 slides while being in contact with the slope surface 58 to make the transmission member 55 move toward the output gear 53 in the rotational axis direction of the input gear 54 (effect of the cam surface).

When the transmission member 55 moves towards the output gear 53 in the rotational axis direction of the input gear 54, the ratchet 62 of the transmission gear 55 moves to a position where it meshes with the ratchet 66 of the output gear 53. Here, the surface 72 of the protrusion 59 of the input gear 54 comes into contact with the surface 70 that smoothly continues to the slope surface 58. Thus, the driving force from the input gear 54 is transmitted from the surface 72 to the surface 70. As a result, the driving force is transmitted to the ratchet 62 of the transmission member 55, and thus is further transmitted to the ratchet 66 of the output gear 53 which is meshing with the ratchet 62, whereby the output gear 53 rotates.

Finally, an operation of switching the state where the driving force is transmitted to the output gear 53 to the state where the drive train is disconnected will be described.

The transmission member 55 and the input gear 54 are in such a positional relationship that the surface 72 of the protrusion 59 is in contact with the surface 70 of the slope surface 58, as described above. When the motor rotates in the reverse direction in this state, the surface 71 of the protrusion 59 of the input gear 54 comes into contact with the surface 69 of the slope surface 58. Thus, the input gear 54 transmits the driving force in the reverse rotation direction to the transmission member 55. Here, the output gear 53 remains still due to the rotational load of the pressing roller 20, whereby the transmission member 55 rotates relative to the output gear 53 in such a direction that the ratchet 62 does not mesh (engage) with the ratchet 66. Thus, the ratchet 62 of the transmission member 55 climbs over the ratchet 66 of the output gear 53. As a result, the transmission member 55 moves toward the input gear 54 in the rotational axis direction of the input gear 54, to a position at which the ratchet 62 is not in contact with the ratchet 66 as illustrated in FIG. 8.

As described above, in the clutch unit 50, the transmission member 55 is movable to the position where the ratchet 62 meshes (engages) with the ratchet 66 of the output gear 53 and to the position where the ratchet 62 does not mesh (engage) with the ratchet 66 of the output gear 53.

<Countermeasure Against Drive Transmission Failure>

As described above, the gap between the ratchet outer circumferential surface 63 of the transmission member 55 and the inner circumferential surface 64 of the output gear 53 is filled with the grease as the viscous member. Thus, the switching operation between the disconnection and connection of the drive train in the clutch unit 50 can surely be performed.

However, when the gap between the transmission member 55 and the output gear 53 is filled with an excessive amount of grease, the grease might be pushed out to flow toward a side of the input gear 54, of the transmission member 55.

Figure 11:
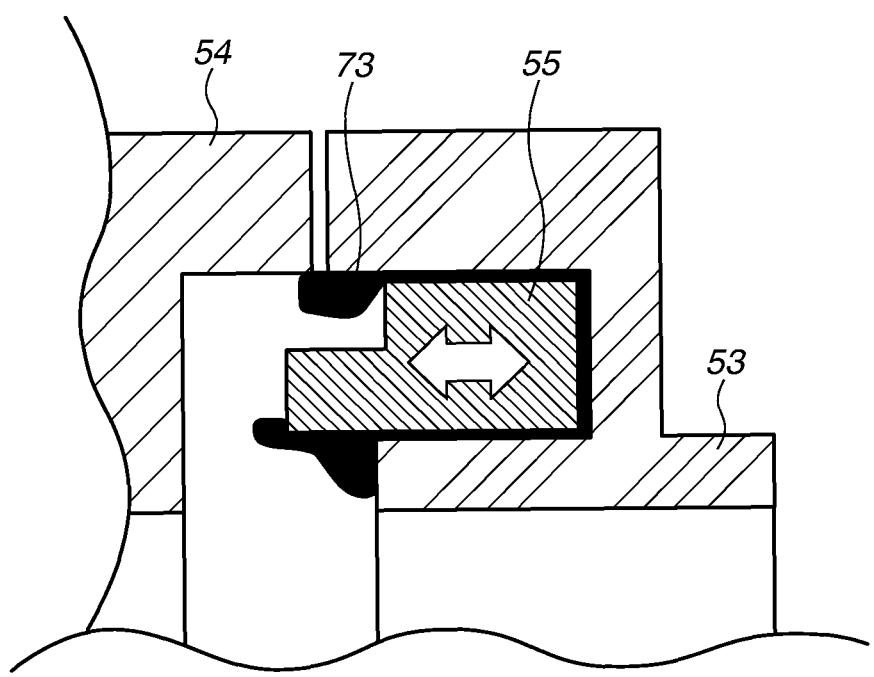
FIG. 11 is a schematic cross-sectional view of a state where grease is pushed out towards the input gear.

FIG. 11 is a partial cross-sectional view of the clutch unit 50 in a state where the grease is pushed out towards the input gear 54. This is a state where excess grease 73 is gradually pushed out by the repetitive movement of the transmission member 55 in the rotational axis direction of the input gear 54 and flows toward the input gear 54.

When the excess grease 73 enters the gap between the input gear 54 and the transmission member 55, the viscosity causes the input gear 54 and the transmission member 55 to integrally rotate. Thus, when the motor 48 rotates in the normal direction, the force for integrally rotating the input gear 54 and the transmission member 55 might be larger than the force for integrally rotating the output gear 53 and the transmission member 55. As a result, drive transmission failure might occur. Specifically, the transmission member 55 becomes unable to move toward the output gear 53 in the rotational axis direction of the input gear 54 and thus the ratchets 62 and 66 do not mesh with each other.

As one possible method to prevent the drive transmission failure, a grease filling jig is used in a step of assembling the clutch unit 50. Specifically, the filling amount is controlled by the grease filling jig to be constant, so that the gap is not filled with an excessive amount of grease due to the fluctuating grease filling amount. The method can prevent the fluctuation of the filling amount of the grease to a certain extent, so that the excess grease 73 is less likely to flow into the gap between the input gear 54 and the transmission member 55. However, even with such a jig, the fluctuation of the grease filled amount cannot be completely prevented. On top of that, an extra manufacturing cost is required when using the jig.

Therefore, in this embodiment, the holes 74 are formed in an end surface of the output gear 53 in the rotational axis direction as shown in FIGS. 6 and 7.

In this exemplary embodiment, the holes 74, which are through holes extending in the rotational axis direction of the input gear 54, are formed at six positions overlapping the transmission member 55 as viewed in the rotational axis direction of the input gear 54.

Figure 12:
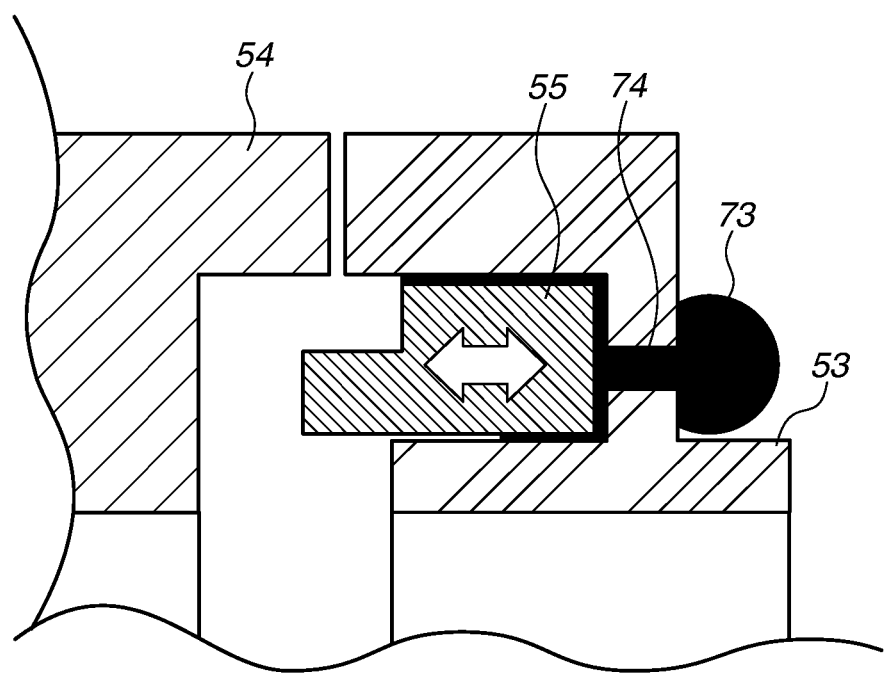
FIG. 12 is a schematic cross-sectional view of a state where the grease has entered a hole.

The holes 74 are in communication with the gap between the ratchet outer circumferential surface 63 of the transmission member 55 and the inner circumferential surface 64 of the output gear 53. Thus, when the transmission member 55 repeatedly moves in the rotational axis direction, as illustrated in FIG. 12, the excess grease 73 is pushed into the holes 74 and held in the holes 74 or discharged to the outside from the output gear 53. In other words, the holes 74 are disposed at the positions to be in communication with the gap between the ratchet outer circumferential surface 63 of the transmission member 55 and the inner circumferential surface 64 of the output gear 53 and enable the excess grease 73 to enter. FIG. 12 is a partial cross-sectional view of the clutch unit 50 in a state where the grease has entered the hole 74 of the output gear 53.

As illustrated in FIGS. 6 and 7, an annular groove 75 is formed at a portion of the output gear 53, on the outer side of the ratchet 66 in a radial direction. Thus, a buffer area for the grease 73 (a space where the grease 73 is stored) can be secured in a state where the ratchet 62 of the transmission member 55 is meshing with the ratchet 66 of the output gear 53. Thus, a certain amount of grease 73 can be held in this area. When the grease 73 is held as described above, the grease 73 is less likely to flow into the gap between the input gear 54 and the transmission member 55.

The number of holes 74, which is six in this exemplary embodiment, is not particularly limited to this number and may be any number not less than 1. The hole 74 may not necessarily be through holes provided through the output gear 53. Thus, the hole 74 may be a recess that is formed on the side of the transmission member 55 of the output gear 53, and does not penetrate through the output gear 53.

With this configuration, the excess grease 73 is not discharged to the outside from the output gear 53 but is still stored in the holes 74. Thus, a certain amount of grease 73 is held in the holes 74, whereby the grease 73 is less likely to flow into the gap between the input gear 54 and the transmission member 55. Still, the hole 74 formed as a through hole facilitates letting-out of the air inside the hole 74, and thus facilitates the flowing of the excess grease 73 into the hole 74.

As described above, in this exemplary embodiment, the transmission member is provided with the holes in communication with the gap between the transmission member and the output member which is filled with the viscous material. Thus, an excess portion of the viscous material can enter the holes to be held therein, and thus the viscous material is less likely to enter the gap between the input member and the transmission member, whereby the operation failure of the transmission member caused by the viscous material can be prevented.

In this second exemplary embodiment, a configuration of the clutch unit 50 for preventing a user from directly touching the grease 73 that has been pushed out from the through holes 74 of the output gear 53, will be described. The components that are the same or have the same function as the counterparts in the first exemplary embodiment are assigned the same reference numerals and will not be described.

In this exemplary embodiment, the fixing device 18 can be detached from the image forming apparatus main body 100 to be replaced or for the maintenance. When the fixing device 18 is detached from the image forming apparatus main body 100, the clutch unit 50 is exposed. The clutch unit 50 transmits the driving force to the pressing roller 20 through the first path as illustrated in FIG. 5.

When an amount of the excess grease 73 is large, the grease 73 that has entered the holes 74 might be exposed (discharged) to the outer side of the output gear 53. Thus, when the user accidentally touches the clutch unit 50, the grease 73 that has been discharged to the outside of the output gear 53 might stick to the user.

Figure 13:
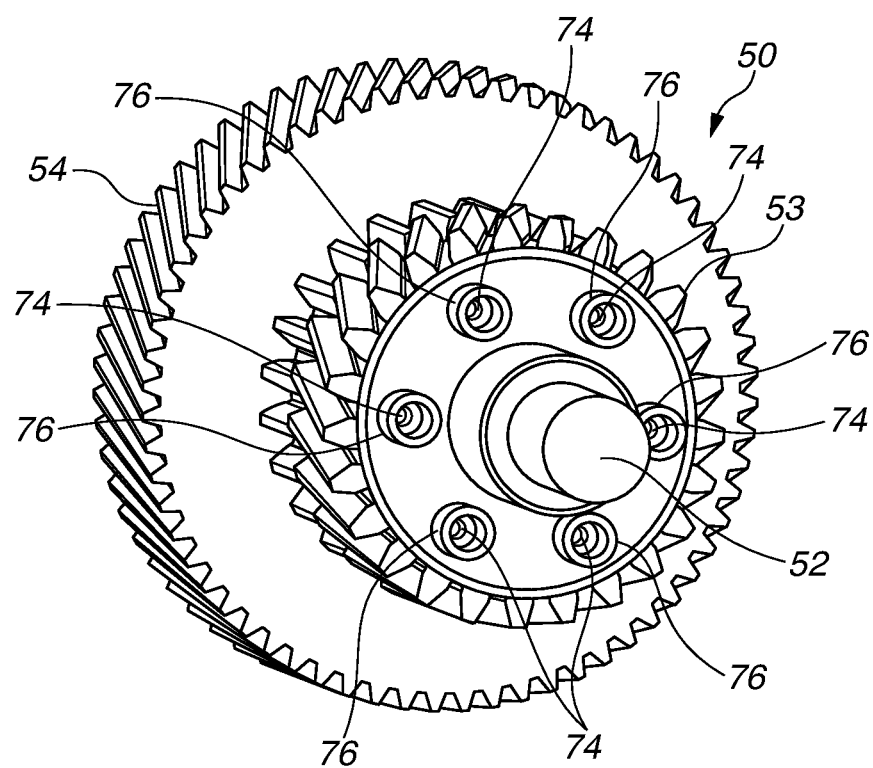
FIG. 13 is a perspective view of the entire one way clutch gear unit.
Figure 14:
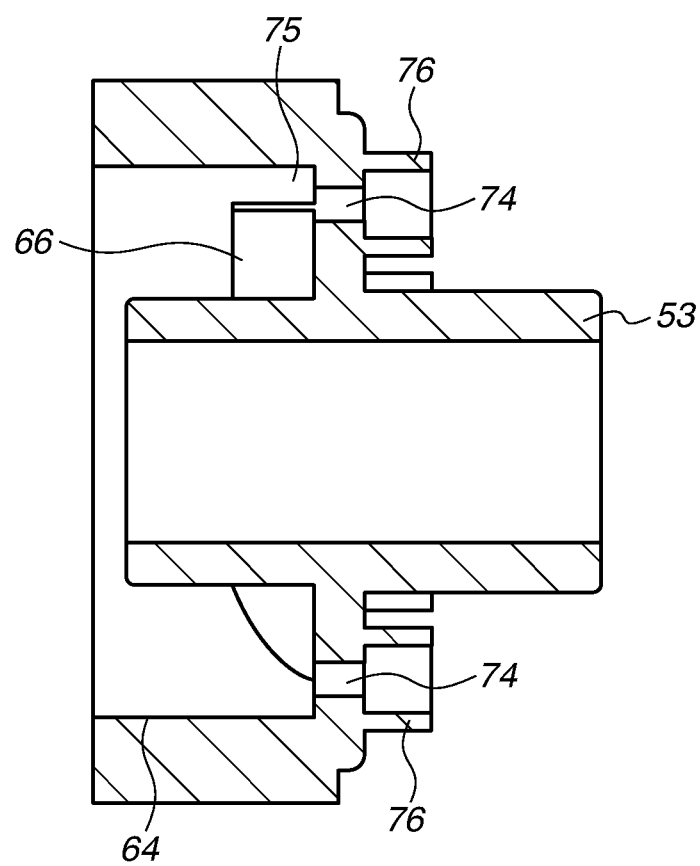
FIG. 14 is a cross-sectional view of the output gear.

With a configuration in this exemplary embodiment, the user is not allowed to directly touch the grease 73 that has been pushed out through the holes 74 of the output gear 53. FIG. 13 is a perspective view of the clutch unit 50. FIG. 14 is a cross sectional view of the output gear 53. Specifically, annular ribs (protrusions) 76 that each surround the outer side circumference of the hole 74 are disposed on the side of the output gear 53 opposite to the ratchet 66.

The inner diameter of the annular rib 76 is set to be small enough to prevent the user's finger from entering. The rib 76 is set to have the highest possible height allowed by the space, whereby the buffer area (the volume of the space for storing the grease 73) for the grease 73 is secured.

In this exemplary embodiment, the ribs 76 are disposed around the holes 74, on the side of the output gear 53 opposite to the ratchet 66. Thus, the area within the rib 76 serves as the area for storing the grease 73. This prevents the user from touching the grease 73 that has been pushed out from the holes 74. Thus, the user's hand cannot be smeared with the grease 73.

Figure 15:
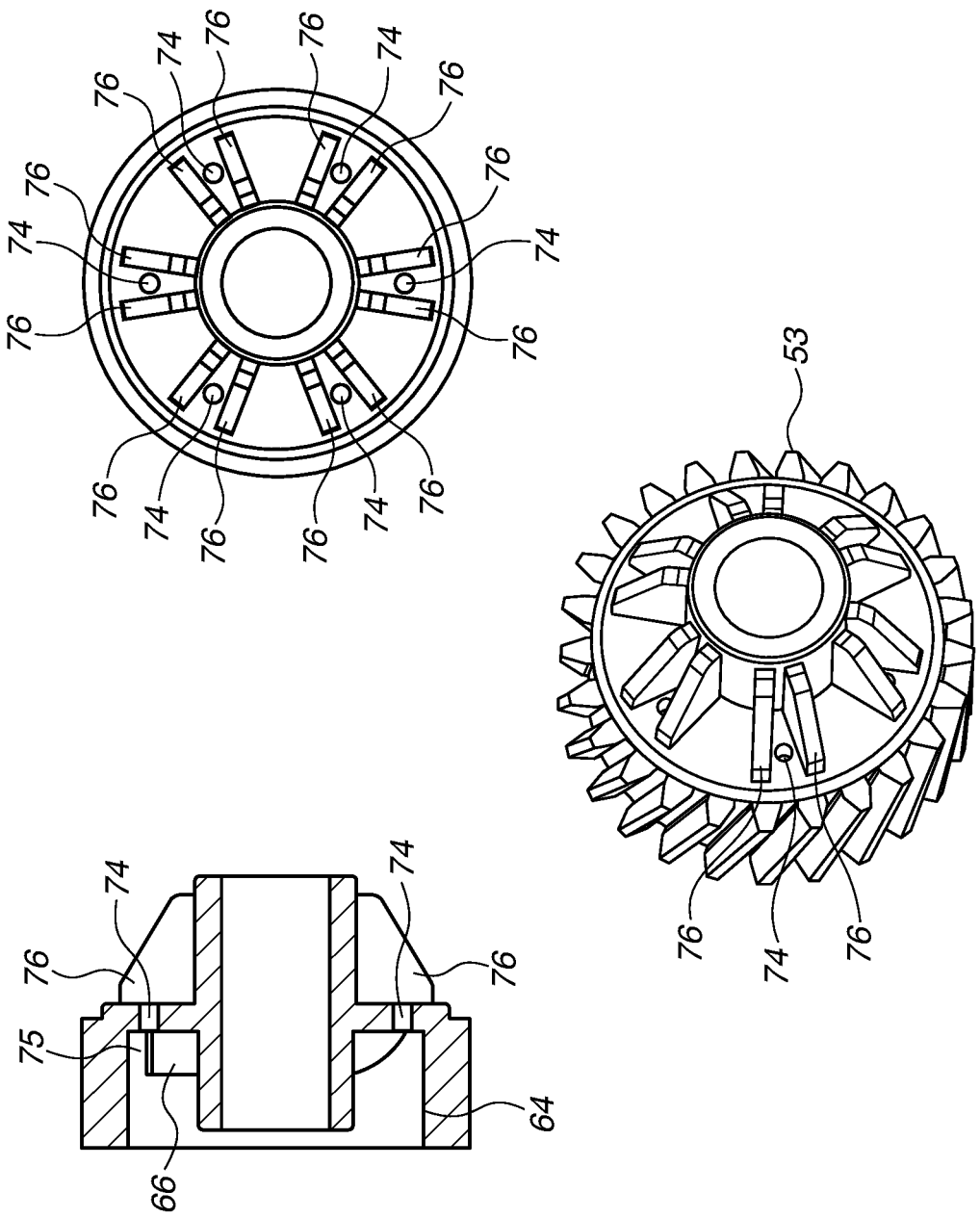
FIG. 15 are diagrams of an end surface and a cross section of the output gear.

As illustrated in FIG. 15, the shape of the rib 76 is not limited to the annular shape, and any rib 76 that is disposed adjacent to the hole 74 and protrudes toward the side of the output gear 53 opposite to the ratchet 66 may be used. In the configuration illustrated in FIG. 15, the rib 76 functions as a reinforcement unit for increasing the rigidity of the output gear 53.

As described above, this exemplary embodiment can produce the same effect as the first exemplary embodiment. Specifically, an excess portion of the viscous material can enter the holes and can be held therein, and thus the viscous material is less likely to enter the gap between the input member and the transmission member, whereby the operation failure of the transmission member caused by the viscous material can be prevented.

Furthermore, in this exemplary embodiment, even when the viscous material that has entered the hole is exposed (discharged) to the outside of the output member, the viscous material is less likely to stick to the user.

In a third exemplary embodiment, a configuration is described in which a unit detachably attached to the image forming apparatus main body 100 is provided, and the clutch unit 50 is used for the drive train for transmitting the driving force to the detachable unit. The components that are the same or have the same function as the counterparts in the first exemplary embodiment are assigned the same reference numerals and will not be described.

<Transmission of Driving Force Through Coupling>

Figure 16:
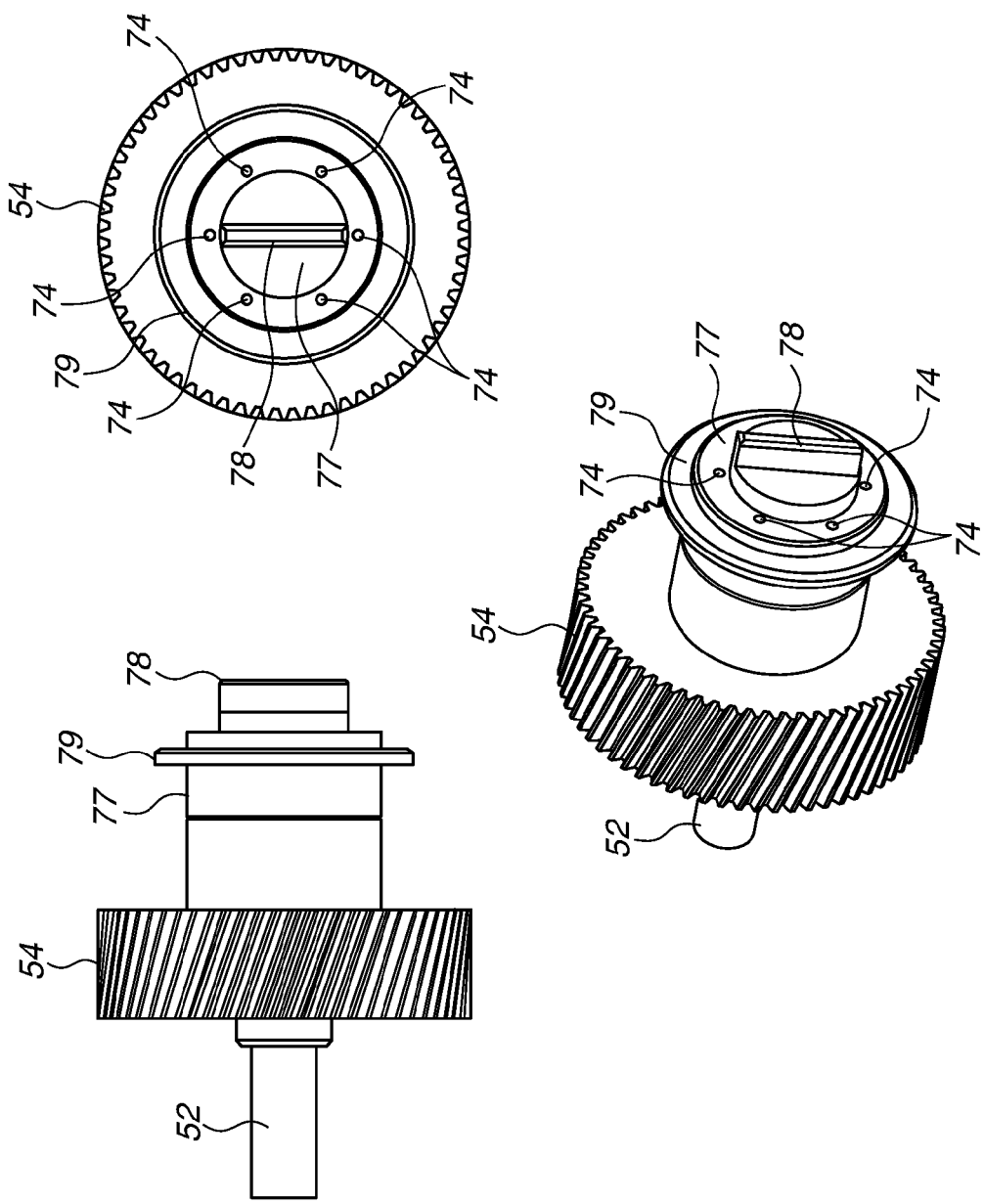
FIG. 16 shows perspective views of the one way clutch gear unit employing coupling.

Coupling is one drive transmission unit (coupling for drive transmission) that enables the connection and disconnection of the image forming apparatus main body 100 to and from the detachable unit. In this exemplary embodiment, a configuration is described, in which the output member of the clutch unit 50 is provided with a coupling member on a side of the image forming apparatus main body 100 (main body side). FIG. 16 is a diagram of the clutch unit 50 employing the coupling. The clutch unit 50 is disposed in the image forming apparatus main body 100.

Figure 17:
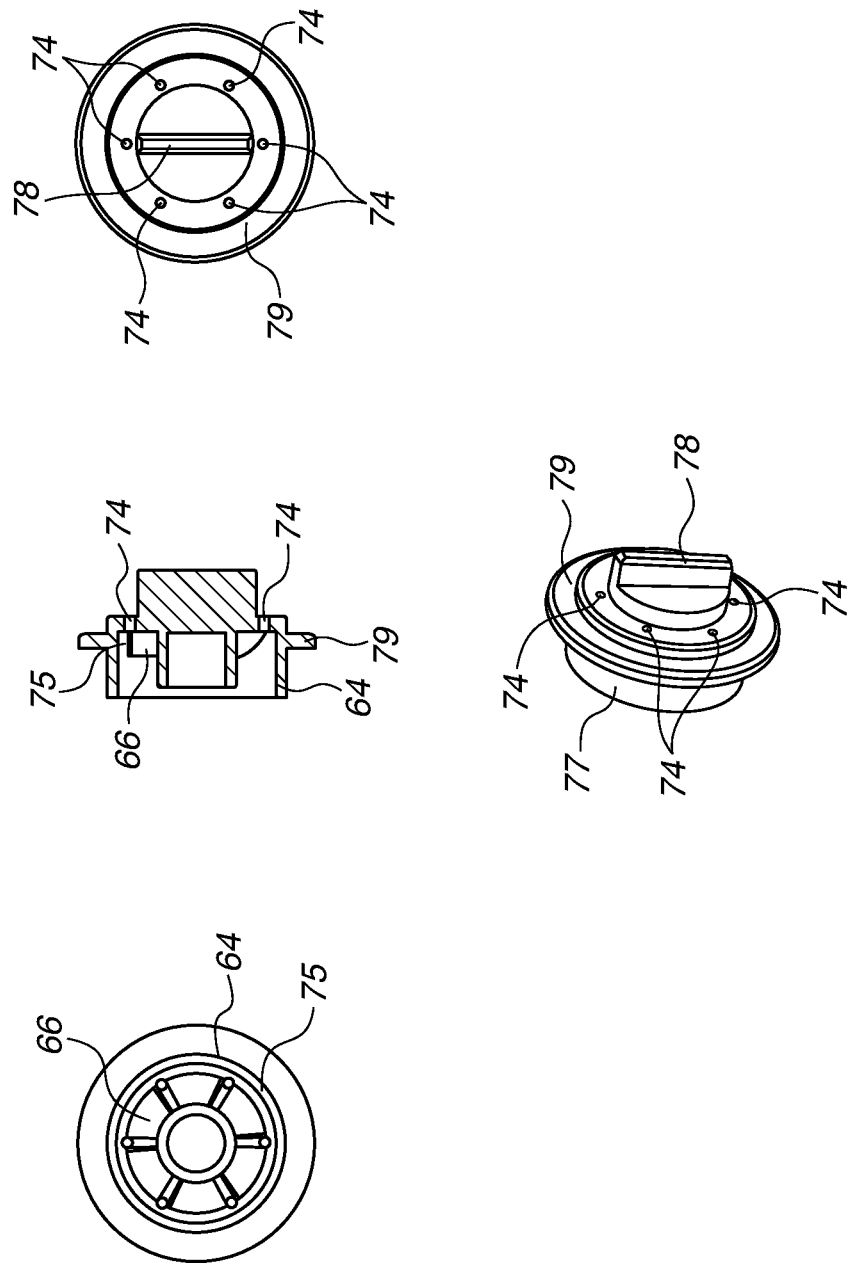
FIG. 17 are diagrams of an end surface and a cross section of a main body side coupling member.
Figure 18:
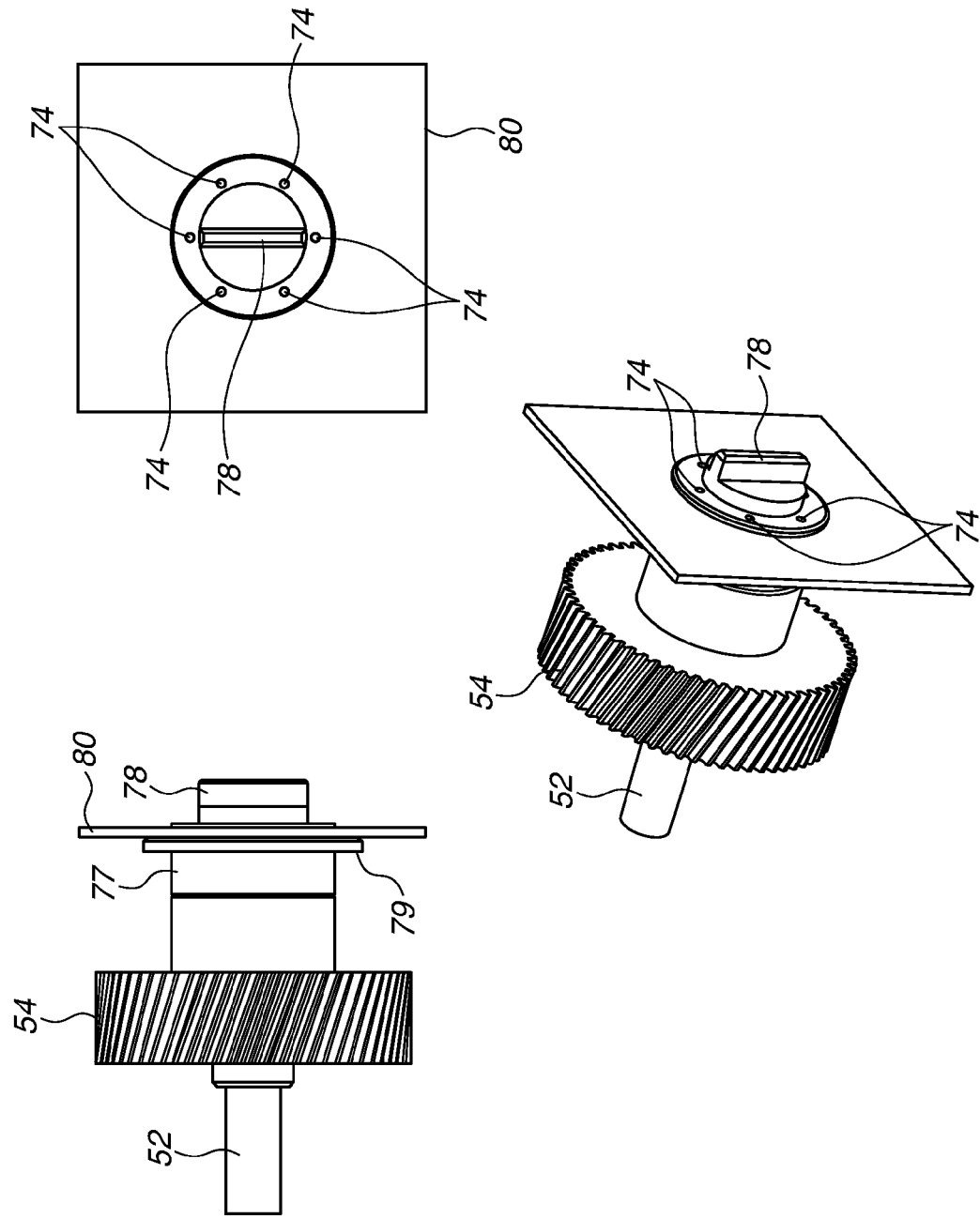
FIG. 18 are perspective views of a side plate of an image forming apparatus main body and the one way clutch gear unit.

A main body side coupling member 77 as the output member is provided with a coupling protrusion 78. FIG. 17 illustrates an end surface and cross section of the main body side coupling member 77. The coupling protrusion 78 has the corners chamfered to allow easily engaging with an interface part of the detachable unit (coupling member on a side of the detachable unit). An annular rib 79, which prevents the main body side coupling member 77 from being pulled out in the rotational axis direction, is disposed on an outer circumferential portion. FIG. 18 illustrates the configurations of the clutch unit 50 and a side plate 80 of the image forming apparatus main body 100. The main body side coupling member 77 rotates while the annular rib 79 slides on the side plate 80.

Holes of the side plate 80, through which the main body side coupling member 77 is exposed, are spaced from the main body side coupling member 77, so as not to come into contact with the main body side coupling member 77.

Figure 19:
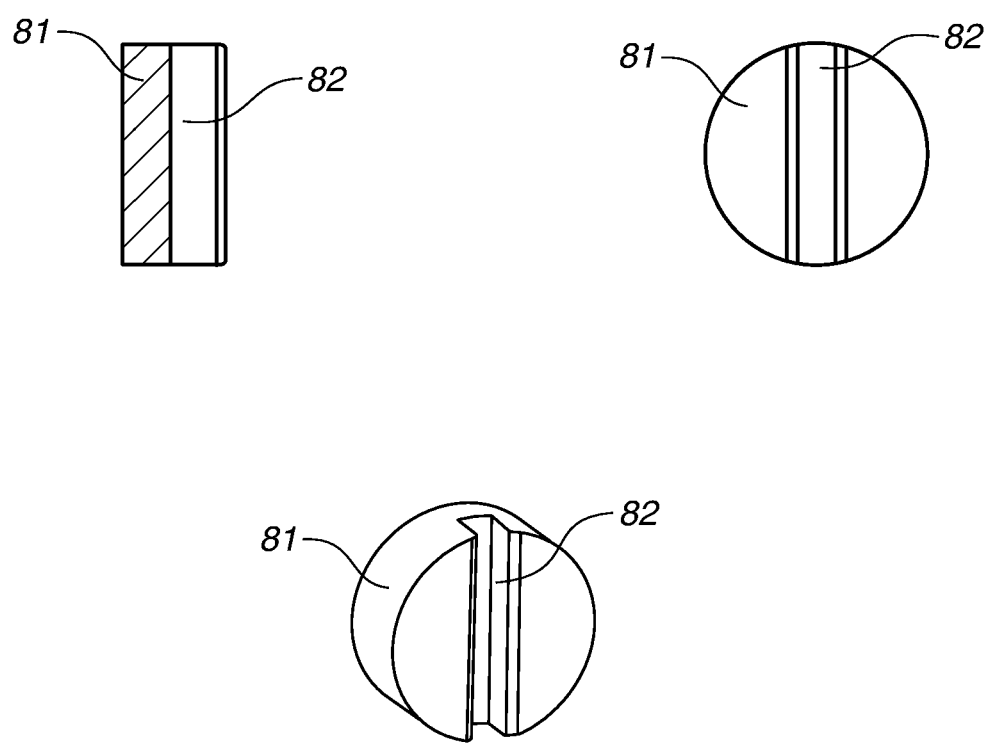
FIG. 19 are front and cross-sectional views of a unit side coupling member.

Next, a coupling member 81 disposed on a detachable unit side will be described. FIG. 19 illustrates a front view and a cross-sectional view of the detachable unit side coupling member 81. First, the relationship between the detachable unit and the detachable unit side coupling member 81 will be described. The detachable unit side coupling member 81 rotates in the circumferential direction to transmit the driving force to the rotary member through an unillustrated drive train within the detachable unit. The detachable unit side coupling member 81 is movable in the rotational axis direction, and is pressed in the rotational axis direction by an unillustrated elastic member. Next, detail portions of the detachable unit side coupling member 81 will be described.

A coupling recess 82 that engages with the coupling protrusion 78 is disposed at the center of the detachable unit side coupling member 81. The coupling recess 82 is wider than the detachable unit side coupling member 81. The coupling recess 82 has the corner chamfered to allow easily engaging with the coupling protrusion 78.

Figure 20:
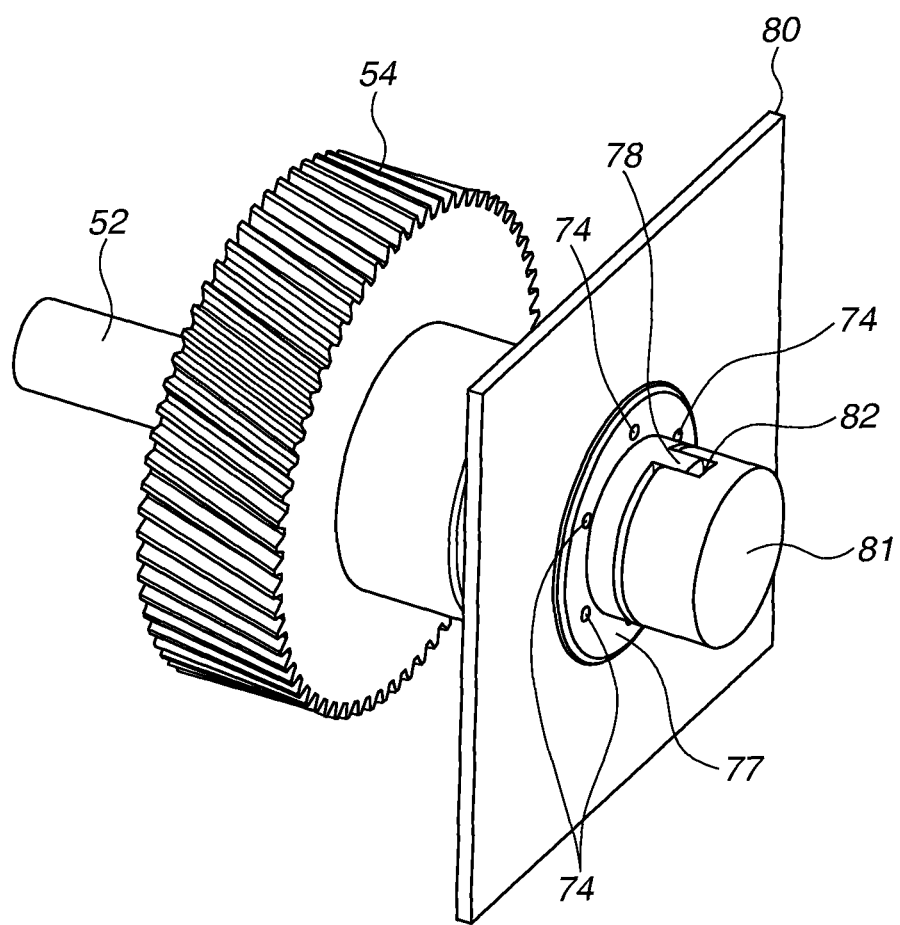
FIG. 20 is a perspective view of the one way clutch gear unit in a coupling state.

Next, the engagement of the coupling will be described. In a state where the detachable unit is attached to the image forming apparatus main body 100 and the coupling protrusion 78 is not engaged with the coupling recess 82, the detachable unit side coupling member 81 is retracted in the rotational axis direction. Then, the main body side coupling member 77 rotates in this state, and when the phases of the coupling protrusion 78 and the coupling recess 82 match, the retracted detachable unit side coupling member 81 moves in the rotational axis direction. Thus, the coupling protrusion 78 engages with the coupling recess 82. Through such an operation, the coupling of the clutch unit 50 can be achieved as illustrated in FIG. 20.

As described above, the clutch unit 50 of this exemplary embodiment can prevent the dragging rotation caused by the excess grease 73 that has entered the gap between the input gear 54 and the transmission member 55. This configuration is less likely to be affected by the distance between parts serving as interfaces. Thus, the coupling member may be smaller than the gear, so that the driving power can be surely transmitted by controlling the portion where the grease 73 is present. Thus, the drive transmission failure of the interface can be prevented, and a space saving can be achieved. The coupling employs the I letter shape in this exemplary embodiment, however it may have any shape as long as the driving force can be transmitted to the detachable unit.

As described above, this exemplary embodiment can provide the same effect as the first exemplary embodiment. Specifically, an excess portion of the viscous material can enter the holes and be held therein, and thus the viscous material is less likely to enter the gap between the input member and the transmission member, whereby the operation failure of the transmission member caused by the viscous material can be prevented.

Furthermore, in this exemplary embodiment, the drive transmission failure to the detachable unit can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-225585 filed Oct. 30, 2013, which is hereby incorporated by reference herein in its entirety.

What is claimed is:

1. A drive transmission device comprising:
   an input member rotated by a drive source;
   a transmission member that rotates with the input member; and
   an output member that rotates while being engaged with the transmission member,
   wherein the transmission member moves in a rotational axis direction of the input member, and moves to a position for engaging with the output member and a position for not engaging with the output member, and when the input member is rotating in a first direction, the transmission member engages with the output member so that the output member rotates, and when the input member rotates in a second direction opposite to the first direction, the transmission member does not engage with the output member, and
   wherein a gap filled with a viscous material is disposed between the output member and the transmission member, and a hole communicating with the gap is formed in the output member by penetrating through the output member.

2. The drive transmission device according to claim 1, wherein the hole extends in the rotational axis direction.

3. The drive transmission device according to claim 2, wherein the output member comprises: an engagement portion that engages with the transmission member; and a protrusion that is disposed adjacent to the hole on a side opposite to the engagement portion of the output member and protrudes in the rotational axis direction.

4. The drive transmission device according to claim 3, wherein the protrusion is disposed around the hole.

5. The drive transmission device according to claim 1, wherein the hole is disposed at a position overlapping with the transmission member as viewed in the rotational axis direction.

6. The drive transmission device according to claim 1, wherein the hole is disposed at a position enabling the viscous material to enter.

7. The drive transmission device according to claim 1,
wherein the input member includes a contact portion that comes into contact with the transmission member, and
wherein when the input member rotates in the first direction, the input member rotates relative to the transmission member, with the contact portion contacting the transmission member, so that the transmission member moves towards the position for engaging with the output member.

8. The drive transmission device according to claim 7, wherein when the input member rotates in the first direction, the input member and the transmission member integrally rotate in the first direction, after the transmission member is engaged with the output member.

9. A fixing device comprising:
an input member rotated by a drive source;
a transmission member that rotates with the input member;
an output member that rotates while engaging with the transmission member;
a first rotary member rotated by the output member; and
a second rotary member configured to contact the first rotary member to form a nip portion,
wherein the first rotary member and the second rotary member come into contact with each other to form the nip portion in which a recording medium is nipped and heated so that toner is fixed on the recording medium,
wherein the transmission member moves in a rotational axis direction of the input member, and moves to a position for engaging with the output member and a position for not engaging with the output member, and when the input member is rotating in a first direction, the transmission member engages with the output member so that the output member rotates, and when the input member rotates in a second direction opposite to the first direction, the transmission member does not engage with the output member, and
wherein a gap filled with a viscous material is disposed between the output member and the transmission member, and a hole communicating with the gap is formed in the output member by penetrating through the output member.

10. The fixing device according to claim 9, wherein when the input member rotates in the second direction, a pressure contact state of the first rotary member and the second rotary member is cancelled.

11. The fixing device according to claim 9, wherein the hole extends in the rotational axis direction.

12. The fixing device according to claim 11, wherein the output member comprises: an engagement portion that engages with the transmission member; and a protrusion that is disposed adjacent to the hole on a side opposite to the engagement portion of the output member and protrudes in the rotational axis direction.

13. The fixing device according to claim 12, wherein the protrusion is disposed around the hole.

14. The fixing device according to claim 9, wherein the hole is disposed at a position overlapping with the transmission member as viewed in the rotational axis direction.

15. The fixing device according to claim 9, wherein the hole is disposed at a position enabling the viscous material to enter.

16. The fixing device according to claim 9, wherein the input member includes a contact portion that comes into contact with the transmission member, and
wherein when the input member rotates in the first direction, the input member rotates relative to the transmission member, with the contact portion contacting the transmission member, so that the transmission member moves towards the position for engaging with the output member.

17. The fixing device according to claim 16, wherein when the input member rotates in the first direction, the input member and the transmission member integrally rotate in the first direction, after the transmission member is engaged with the output member.

18. An image forming apparatus comprising:
an input member rotated by a drive source;
a transmission member that rotates with the input member;
an output member that rotates while engaging with the transmission member; and
a rotary member rotated by the output member,
wherein an image is formed on a recording medium by rotating the rotary member,
wherein the transmission member moves in a rotational axis direction of the input member, and is able to move to a position for engaging with the output member and a position for not engaging with the output member, and when the input member is rotating in a first direction, the transmission member engages with the output member so that the output member rotates, and when the input member rotates in a second direction opposite to the first direction, the transmission member does not engage with the output member, and
wherein a gap filled with a viscous material is disposed between the output member and the transmission member, and a hole communicating with the gap is formed in the output member by penetrating through the output member.

19. The image forming apparatus according to claim 18, wherein the hole extends in the rotational axis direction.

20. The image forming apparatus according to claim 19, wherein the output member includes an engagement portion that engages with the transmission member and a protrusion that is disposed adjacent to the hole on a side opposite to the engagement portion of the output member and protrudes in the rotational axis direction.

21. The image forming apparatus according to claim 20, wherein the protrusion is disposed around the hole.

22. The image forming apparatus according to claim 18, wherein the hole is disposed at a position overlapping with the transmission member as viewed in the rotational axis direction.

23. The image forming apparatus according to claim 18, wherein the hole is disposed at a position enabling the viscous material to enter.

24. The image forming apparatus according to claim 18, wherein the input member includes a contact portion that comes into contact with the transmission member, and
wherein when the input member rotates in the first direction, the input member rotates relative to the transmission member, with the contact portion contacting the transmission member, so that the transmission member moves towards the position to be engaged with the output member.

25. The image forming apparatus according to claim 24, wherein when the input member rotates in the first direction, the input member and the transmission member integrally rotate in the first direction, after the transmission member is engaged with the output member.

* * * * *